United States Patent
Assaf

(10) Patent No.: US 7,430,878 B2
(45) Date of Patent: Oct. 7, 2008

(54) AIR CONDITIONING SYSTEM AND METHODS

(75) Inventor: Gad Assaf, Beer Sheva (IL)

(73) Assignee: Agam Energy Systems, Ltd. (IL)

( * ) Notice: Subject to any disclaimer, the term of this patent is extended or adjusted under 35 U.S.C. 154(b) by 359 days.

(21) Appl. No.: 10/534,851

(22) PCT Filed: Nov. 11, 2003

(86) PCT No.: PCT/IL03/00943

§ 371 (c)(1),
(2), (4) Date: May 13, 2005

(87) PCT Pub. No.: WO2004/046618

PCT Pub. Date: Jun. 3, 2004

(65) Prior Publication Data

US 2006/0042295 A1  Mar. 2, 2006

(30) Foreign Application Priority Data

Nov. 17, 2002   (IL)  .................................. 152885

(51) Int. Cl.
*F28D 5/00*  (2006.01)
(52) U.S. Cl. .................. 62/314; 261/112.2; 261/153
(58) Field of Classification Search ............. 62/314, 62/185, 282; 261/112.2, 153
See application file for complete search history.

(56) References Cited

U.S. PATENT DOCUMENTS

| | | | |
|---|---|---|---|
| 2,162,158 A | 6/1939 | Coey | |
| 2,420,993 A | 5/1947 | Kelley | |
| 3,712,026 A | 1/1973 | Griffiths et al. | |
| 4,941,324 A * | 7/1990 | Peterson et al. | ................. 62/94 |
| 5,052,472 A * | 10/1991 | Takahashi et al. | ........... 165/299 |
| 6,018,954 A | 2/2000 | Assaf | |
| 6,266,975 B1 | 7/2001 | Assaf | |
| 6,487,872 B1 * | 12/2002 | Forkosh et al. | ................. 62/271 |
| 2002/0116933 A1 * | 8/2002 | Chi et al. | ...................... 62/93 |

* cited by examiner

*Primary Examiner*—William E Tapolcai
(74) *Attorney, Agent, or Firm*—Bachman & LaPointe, P.C.

(57) ABSTRACT

An air conditioning system for conditioning the space within an enclosure having at least one inlet and one outlet, the system comprising first and second liquid/air heat exchangers; the first heat exchanger having an opening for receiving fresh air from the environment and for propelling the fresh air through the first heat exchanger to exchange heat with the liquid before it is entered into the enclosure, and the second heat exchanger having an opening for receiving air from the enclosure and for propelling it through the second heat exchanger to exchange heat with the liquid before it is expelled into the atmosphere. There are also provided methods for air-conditioning an enclosed space and for evaporation of industrial wastes.

21 Claims, 4 Drawing Sheets

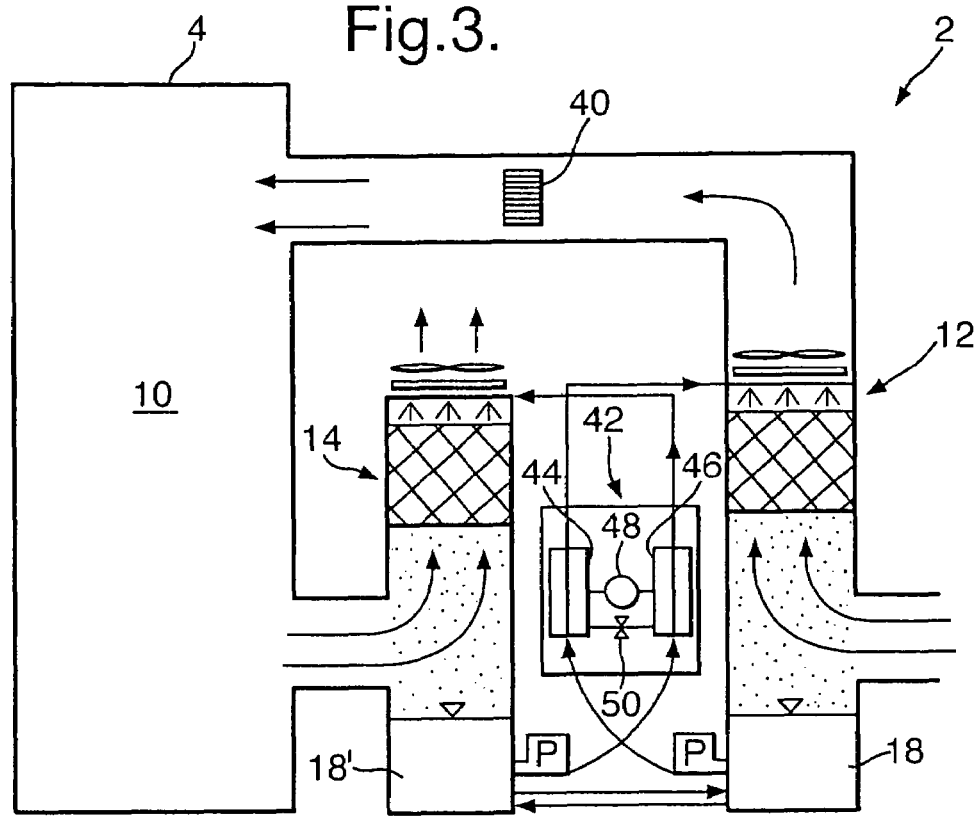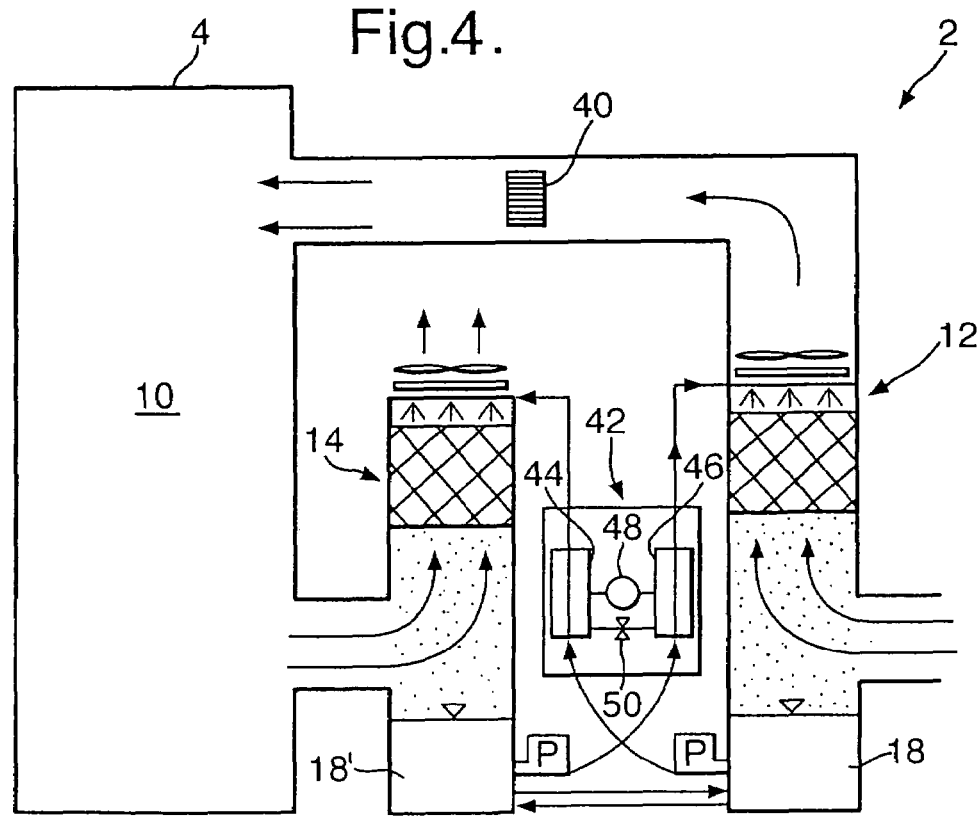

AIR CONDITIONING SYSTEM AND METHODS

FIELD OF THE INVENTION

The present invention relates to air conditioning systems and methods. More specifically, the invention relates to fresh air conditioning systems and methods for both summer and winter use.

BACKGROUND OF THE INVENTION

Modern homes require air conditioning, specifically, cooling in summer and heating in winter. The flow of fresh air is also necessary, in order to remove unwanted gases and odors. When the enthalpy gradient between outside and inside air is large, the flow of fresh air associated with energy consumption, for cooling in summer and heating in winter, increases. Thus, in tropical climates, where the outside air enthalpy is 90 kJ/kg and inside air is kept at 52 kJ/kg, the flow of fresh air required to exchange 1 kg of air increases the latent load by 38 kJ. Similarly, in the winter, the exchange of fresh air increases the heating load.

DISCLOSURE OF THE INVENTION

It is thus a broad object of the present invention to provide systems and methods for fresh air conditioning of a space within an enclosure, utilizing heat and liquid exchange between fresh air flowing into the system and air exiting from the enclosure.

In accordance with the invention, there is provided an air conditioning system for conditioning the space within an enclosure having at least one inlet and one outlet, said system comprising first and second liquid/air heat exchangers; said first heat exchanger having an opening for receiving fresh air from the environment and for propelling the fresh air through said first heat exchanger to exchange heat with the liquid before it is entered into said enclosure, and said second heat exchanger having an opening for receiving air from the enclosure and for propelling it through said second heat exchanger to exchange heat with the liquid before it is expelled into the atmosphere.

The invention further provides a method for air-conditioning an enclosed space, comprising providing an air-conditioning system according to the present invention, and pre-cooling said liquid prior to entering same into the evaporator by utilizing cooled air from said space.

The invention still further provides a method for air-conditioning an enclosed space, comprising providing an air-conditioning system according to the present invention, and utilizing the heat pump for preconditioning the liquid passing therethrough before propelling the liquid through said heat exchangers.

The method still further provides a method for evaporation of industrial wastes according to the present invention; replenishing the reservoir of the heat exchanger receiving fresh air from the environment with liquid desiccant, and draining excess water from the reservoir of the other heat exchanger.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic, cross-sectional view of an air conditioning system according to the present invention;

FIGS. 2 and 3 are schematic, cross-sectional views of the system of FIG. 1, including a heat pump illustrating two possible operation modes of the system during summer conditions, FIGS. 4 and 5 are schematic, cross-sectional views of the system of FIG. 1, including a heat pump illustrating two possible operation modes of the system during winter conditions;

FIG. 6 is a schematic, cross-sectional view of the system according to the present invention, for industrial waste evaporation, and FIG. 7 is a schematic, cross-sectional view of the system according to the present invention for utilizing a multi-way valve, enabling summer and winter operations.

DETAILED DESCRIPTION OF PREFERRED EMBODIMENTS

Figure 1:
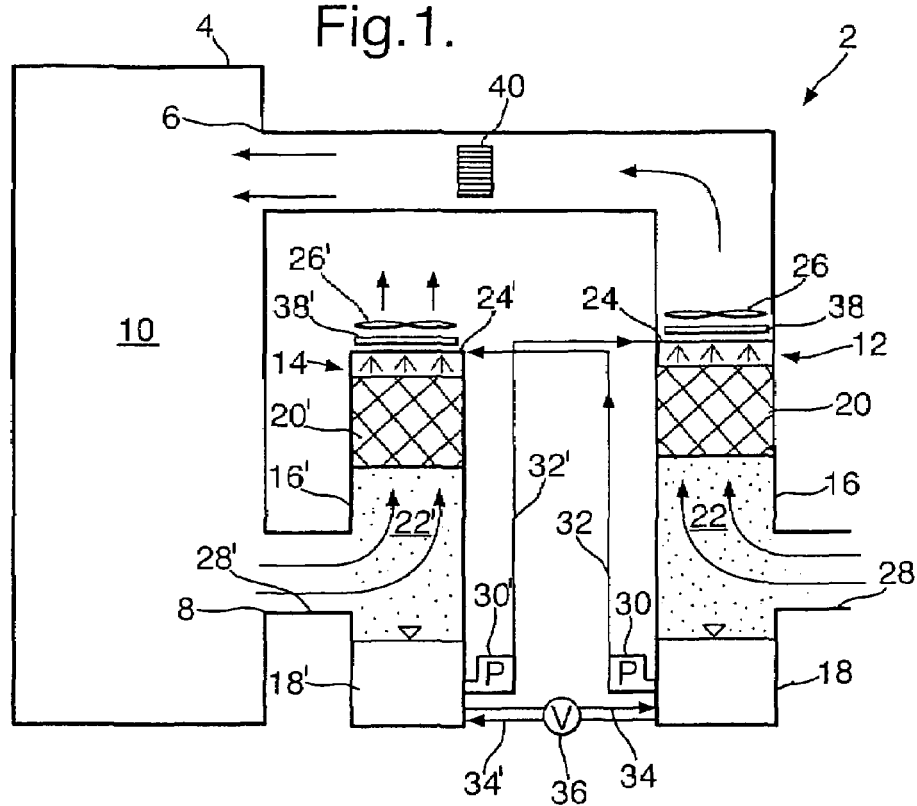

Illustrated in FIG. 1 is a preferred embodiment of the present invention, of a system 2 for air conditioning an enclosure during both summer and winter. It should be noted, however, that with minor modifications that will become apparent hereinafter, the system can be utilized for air conditioning during summer or winter, as required.

Shown in FIG. 1 is an enclosure 4, having an air conditioning inlet opening 6 and an air conditioning outlet opening 8 and defining an air-conditioned space 10. System 2 is essentially composed of two substantially similar, preferably direct-contact, heat exchangers 12, 14. Each of the heat exchangers includes a housing 16, 16'; a liquid reservoir 18, 18'; an evaporative media 20, 20'; a dripping chamber 22, 22' interposed between the reservoir and the evaporative media; liquid outlets 24, 24', e.g., nozzles or sprayers, and a fan 26, 26', located above outlets 24, 24'. The fans 26, 26' can be substituted by blowers (not shown), located at or adjacent to the fresh air inlet port 28 of heat exchanger 12 and air inlet port 28' connected to and receiving air from the space 10.

The liquid which can be used in the system, according to the present invention, can be with water, however, it is preferred to use a liquid desiccant and specifically brine. The following description will therefore relate to brine as a non-limiting example of a liquid.

Brine from reservoirs 18, 18' is selectively propelled by pumps 30, 30', through conduits 32, 32' to outlets 24, 24' of heat exchangers 12 and 14, respectively, as is clearly indicated by the arrows. Obviously, instead of the two pumps 30, 30', one pump could be used. The reservoirs 18, 18' are interconnected by conduits 34, 34' to allow the flow of brine from one reservoir to the other, preferably by gravity. Optionally a control valve 36 is provided for controlling the flows between the reservoirs, as required.

Advantageously, system 2 also includes drift eliminators 38, 38', interposed between brine outlets 24, 24' and the fans 26, 26'. A humidifier 40 can also be installed in the passageway between heat exchanger 12 and the inlet 6 to space 10 within enclosure 4.

Figure 2:
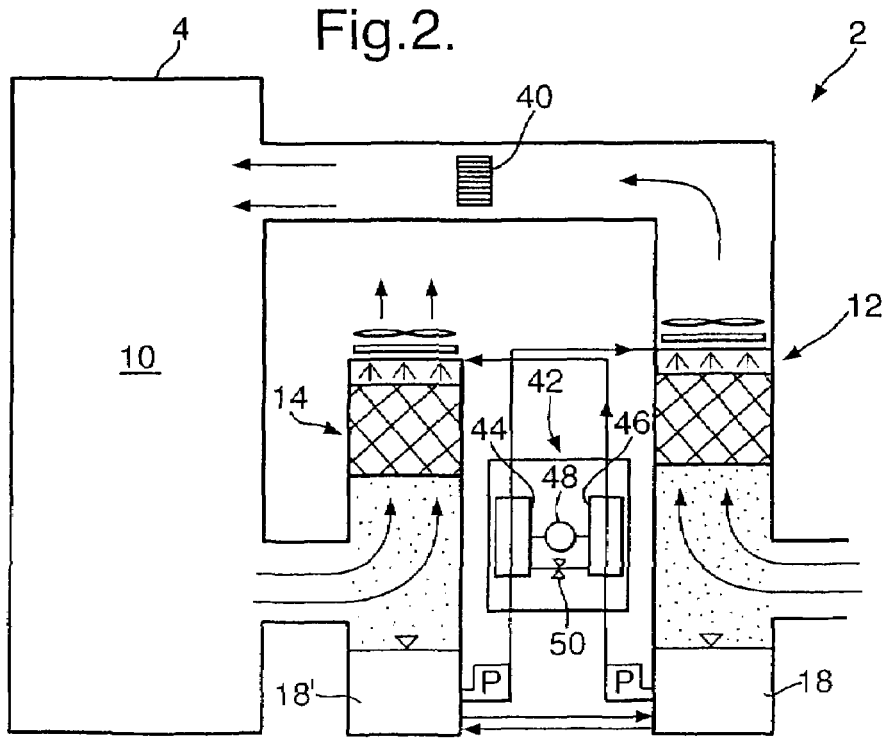

Referring now to FIG. 2, there is illustrated the system 2 of FIG. 1 adapted to improve enthalpy for ordinary summer operation. As seen, the system 2 also includes a heat pump 42, composed of an evaporator 44, a condenser 46, a refrigerant compressor 48 and an expansion valve 50, both interconnecting the evaporator 44 and condenser 46, for circulating the refrigerant in selected directions. Air from the outside is entered into the heat exchanger 12 and exchanges heat and vapor with the brine from reservoir 18' after passing through the evaporator 44 for further cooling before entering the enclosure 4. Thus, the fresh air entering the enclosure 4 is cooler and dryer.

Referring to FIG. 3, there is illustrated the system 2 of the present invention recommended to be used during non-extreme environmental conditions. The relatively cold air exiting from the cooled space 10 is utilized to cool the condenser 46 instead of heating the evaporator 44, as in the embodiment of FIG. 2.

During winter conditions when the outside air is colder than the air inside the enclosure, the system 2 of FIG. 4 can be used. The relatively warmer brine from reservoir 18' is propelled through the condenser 46 to receive extra heat before being utilized to heat the outside air in heat exchanger 12.

Figure 5:
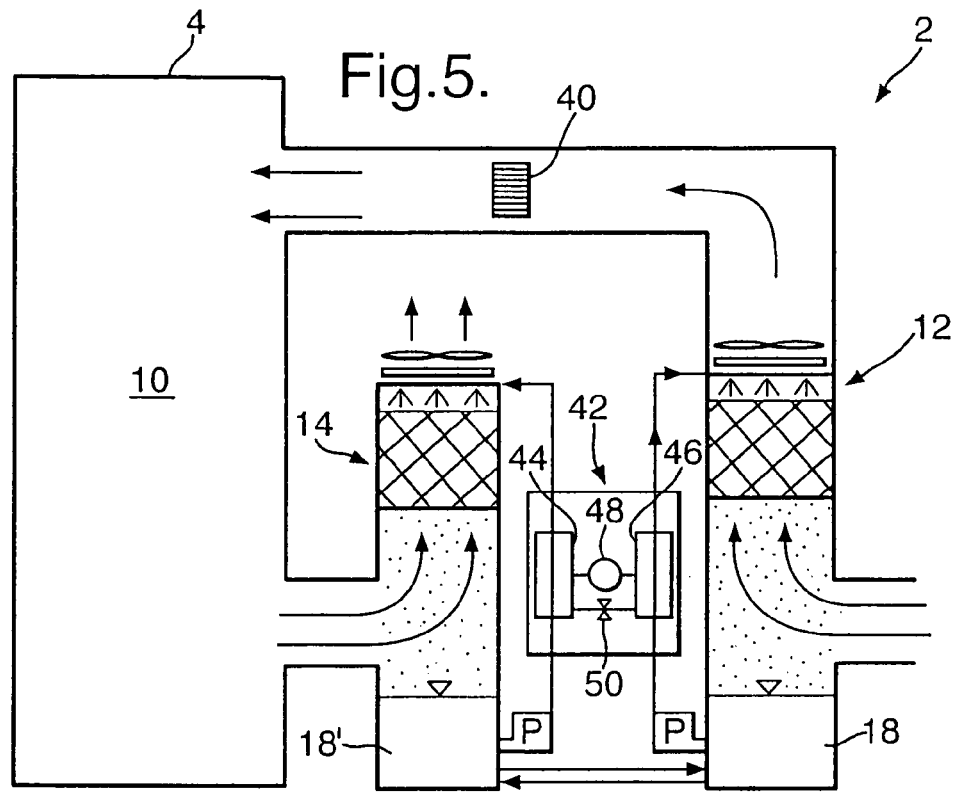

A further embodiment for winter heat conditioning is shown in FIG. 5. The evaporator 44 is relatively warmer than the condenser 46 due to the warmer brine from reservoir 18' passing therethrough. The compressor 48 operates efficiently because of the low pressure gradient between the evaporator 44 and the condenser 46. The latter heats up the fresh air entering the heat exchanger 12 before being propelled into the enclosure 4.

Figure 6:
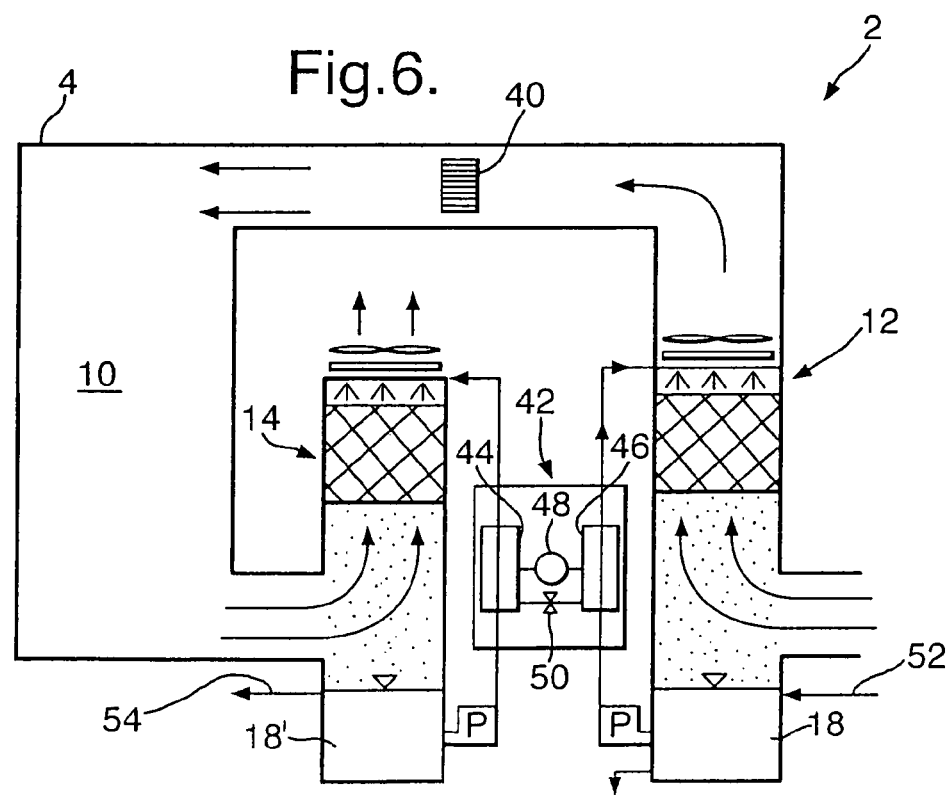

With minor modifications, the system 2 can also be utilized for evaporation of industrial wastes. Seen in FIG. 6 is a system 2 according to the present invention, in which the reservoir 18 is provided with an inlet port 52 for adding brine to replenish evaporation, and reservoir 18' is fitted with an outlet port 54 for draining excess water.

Figure 7:
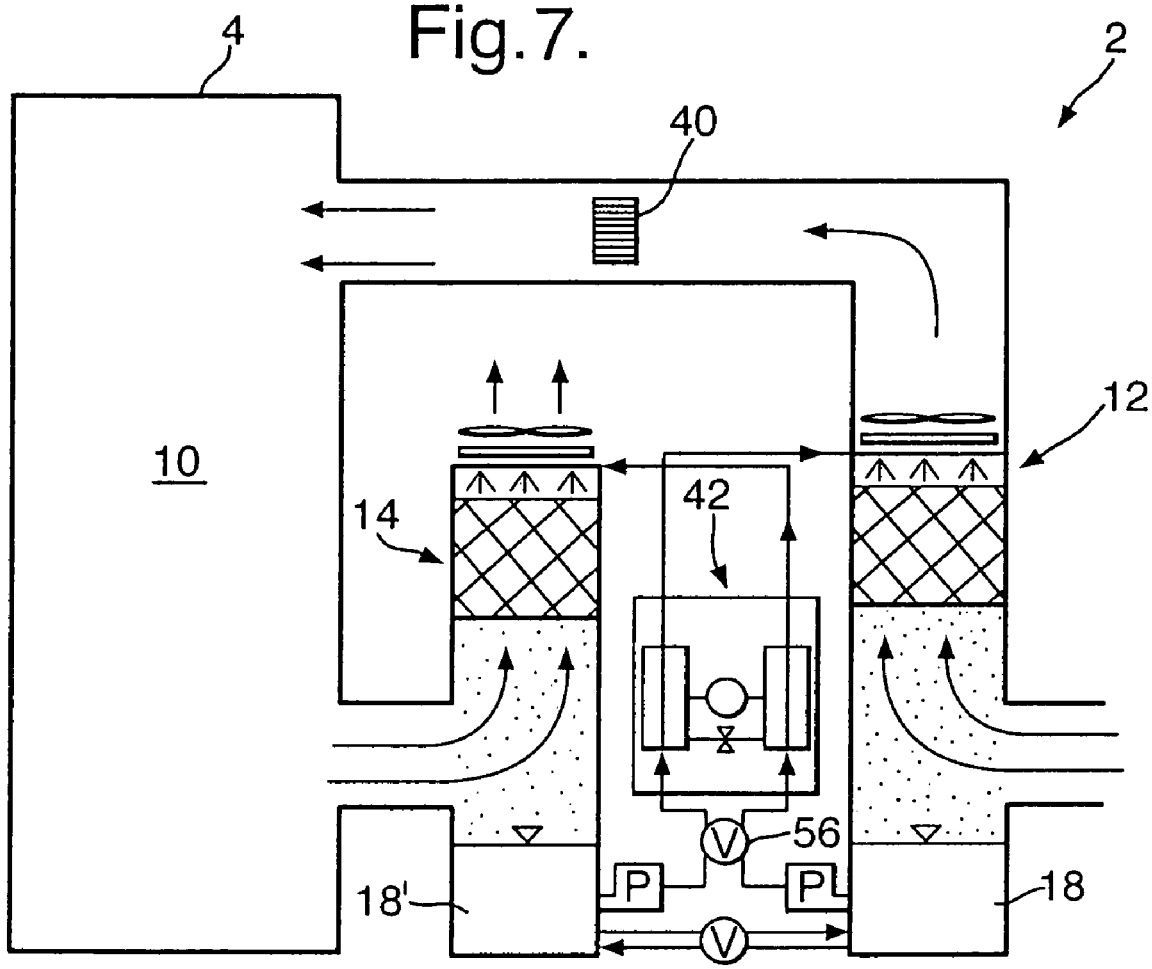

While in the foregoing embodiments separate flow paths have been shown between each of the reservoirs 18, 18' and the heat pump 42, reference is made to FIG. 7 showing the system 2 in which a multi-way valve 56 is provided enabling controlling the flow from each of the reservoirs to the condenser or evaporator of the heat pump 42, for efficient air-conditioning during changing environmental temperatures.

In the preferred embodiments of the invention, it is envisioned to utilize as heat exchangers 12 and 14 the liquid/air direct contact heat exchanger of the type described in the publication WO 00/11426, the teachings of which are incorporated herein by reference.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An air conditioning system for conditioning the space within an enclosure having an air-conditioning space at least one inlet opening and one outlet opening, the system comprising:
   first and second liquid/air heat exchangers each disposed in a housing having an air inlet and an air outlet;
   said first heat exchanger having an opening for receiving fresh air from the environment and for propelling the fresh air through said first heat exchanger to exchange heat with the liquid of said second liquid/air heat exchanger before it is entered into said enclosure;
   each of the first and second heat exchangers including:
   a housing having a liquid reservoir at its lower section and an evaporative media at its upper section;
   a dripping chamber between said reservoir and said evaporative media;
   liquid outlets disposed above the evaporative media;
   means for forcing air to enter said housing and form a counter-flow relative to the liquid flow exiting from the liquid outlets,
   means for propelling liquid from the reservoir to said liquid outlets,
   passageway for propelling conditioned air to the opening of said enclosure, and
   the second heat exchanger having an opening connectable to said outlet opening of the enclosure for receiving air from air-conditioned space of the enclosure and for propelling it through said second heat exchanger to exchange heat with the liquid before it is expelled into the atmosphere,
   wherein conduit means directly interconnect the reservoirs, and
   said evaporative media include at least one cross-fluted structure composed of multi-layered, corrugated cardboard sheets forming an array of inlet openings on a first side of said structure, and an array of outlet openings on a second side of said structure substantially opposite said first side, wherein said evaporative media has a Reynolds air flow number of less than 2000.

2. The system as claimed in claim 1, further comprising a heat pump, said first and second heat exchangers being in fluid communication with each other through said heat pump.

3. The system as claimed in claim 2, wherein said heat pump comprising:
   an evaporator;
   a condenser, and
   a refrigerant compressor and an expansion valve interconnecting said evaporator and said condenser.

4. The system as claimed in claim 3, wherein said heat pump further comprising means for reversing the flow of said refrigerant.

5. The system as claimed in claim 2, wherein each of said reservoirs is in fluid communication with said heat pump via pump means.

6. The system as claimed in claim 3, wherein the outlet from said evaporator is in fluid communication with the liquid outlets of said second heat exchanger and the reservoir of said second heat exchanger is in fluid communication with the liquid outlets of said first heat exchanger.

7. The system as claimed in claim 5, further comprising a multi-way valve operationally connected between said reservoirs and said heat pump.

8. The system as claimed in claim 5, wherein the reservoir of said first heat exchanger is in fluid communication with said evaporator and the reservoir of said second heat exchanger is in fluid communication with said condenser.

9. The system as claimed in claim 5, wherein the reservoir of said first heat exchanger is in fluid communication with said condenser and the reservoir of said second heat exchanger is in fluid communication with said evaporator.

10. The system as claimed in claim 1, wherein said means for forcing air into said housing is a fan located above said liquid outlets.

11. The system as claimed in claim 10, further comprising a drift eliminator located between said liquid outlets and said fan.

12. The system as claimed in claim 1, further comprising a humidifier disposed in the passageway leading from said first heat exchanger to said enclosure.

13. The system as claimed in claim 1, wherein one of said reservoirs further comprises an inlet port for adding liquid to replenish evaporation and a second of said reservoirs comprises an outlet port for draining excess liquid.

14. The system as claimed in claim 1, wherein said liquid is a liquid desiccant.

15. The system as claimed in claim 1, wherein said liquid is brine.

16. A method for air-conditioning an enclosed space, comprising:

providing an air-conditioning system as claimed in claim 1, and pre-cooling said liquid prior to entering same into the evaporator by utilizing cooled air from said space.

17. A method for air-conditioning an enclosed space, comprising:

providing an air-conditioning system as claimed in claim 3, and utilizing the heat pump for preconditioning the liquid passing therethrough before propelling the liquid through said heat exchangers.

18. The method as claimed in claim 17, comprising extracting heat from said condenser by cooling liquid passing therethrough with cooled air.

19. The method as claimed in claim 17, comprising pre-heating liquid in said condenser by exchanging heat between liquid and heated air.

20. The method as claimed in claim 19, comprising heating the evaporator by liquid heated by exchanging heat between said liquid and heated air.

21. A method for evaporation of industrial wastes, comprising:

providing a system as claimed in claim 13;

replenishing the reservoir of the heat exchanger receiving fresh air from the environment with liquid desiccant, and draining excess water from the reservoir of the other heat exchanger.

* * * * *